United States Patent
Geisberger et al.

(10) Patent No.: US 11,525,680 B2
(45) Date of Patent: Dec. 13, 2022

(54) ANGULAR RATE SENSOR WITH CENTRALLY POSITIONED COUPLING STRUCTURES

(71) Applicant: NXP USA, Inc., Austin, TX (US)

(72) Inventors: Aaron A. Geisberger, Austin, TX (US); Peng Shao, Chandler, AZ (US)

(73) Assignee: NXP USA, Inc., Austin, TX (US)

(*) Notice: Subject to any disclaimer, the term of this patent is extended or adjusted under 35 U.S.C. 154(b) by 93 days.

(21) Appl. No.: 17/178,167

(22) Filed: Feb. 17, 2021

(65) Prior Publication Data

US 2022/0260372 A1    Aug. 18, 2022

(51) Int. Cl.
*G01C 19/5712*    (2012.01)

(52) U.S. Cl.
CPC ................ *G01C 19/5712* (2013.01)

(58) Field of Classification Search
CPC ........... G01C 19/5705; G01C 19/5712; G01C 19/5719
See application file for complete search history.

(56) References Cited

U.S. PATENT DOCUMENTS

| 7,347,094 | B2  |   | 3/2008  | Geen et al. |              |
|-----------|-----|---|---------|-------------|--------------|
| 7,478,557 | B2  | * | 1/2009  | Geen        | G01C 19/5719 |
|           |     |   |         |             | 73/504.12    |
| 8,733,172 | B2  | * | 5/2014  | Coronato    | G01C 19/5712 |
|           |     |   |         |             | 73/504.12    |
| 9,278,847 | B2  | * | 3/2016  | Cazzaniga   | B81B 3/0018  |
| 9,404,747 | B2  | * | 8/2016  | Valzasina   | G01C 19/5712 |
| 9,927,241 | B2  |   | 3/2018  | Piirainen   |              |
| 10,139,228| B2  |   | 11/2018 | Piirainen   |              |
| 10,209,070| B2  |   | 2/2019  | Geisberger  |              |
| 10,415,968| B2  |   | 9/2019  | Prikhodko et al. |         |
| 10,466,053| B2  | * | 11/2019 | Ruohio      | G01C 19/5747 |
| 10,598,690| B2  | * | 3/2020  | Simoni      | G01P 15/125  |

(Continued)

FOREIGN PATENT DOCUMENTS

EP    3588002 A1    1/2020

OTHER PUBLICATIONS

Igor I. Izyumin et al : "A 7PPM, 6_/HR Frequency-Output MEMS Gyroscope" University of California, Berkeley, California, USA Stanford University, Stanford, California, USA, MEM 2015, Estoril, Portugal, Jan. 18-22, 2015, 4 pages.

(Continued)

*Primary Examiner* — David J Bolduc

(57) ABSTRACT

An angular rate sensor includes first, second, third, and fourth proof masses spaced apart from a surface of a substrate, each of the first, second, third, and fourth proof masses being configured to move along first and second transverse axes parallel to the surface of the substrate. A first coupling structure is interposed between and interconnects the first and second proof masses. A second coupling structure is interposed between and interconnects the second and third proof masses. A third coupling structure is interposed between and interconnects the third and fourth proof masses. A fourth coupling structure is interposed between and interconnects the fourth and first proof masses. The first, second, third, and fourth coupling structures are configured to constrain an in-phase motion of adjacent ones of the first, second, third, and fourth proof masses along the first and second transverse axes.

9 Claims, 9 Drawing Sheets

(56) References Cited

U.S. PATENT DOCUMENTS

| | | | |
|---|---|---|---|
| 10,697,774 B2* | 6/2020 | Prikhodko | G01C 19/574 |
| 10,760,909 B2 | 9/2020 | Geisberger | |
| 10,948,294 B2* | 3/2021 | Gregory | G01C 19/5747 |
| 11,193,771 B1* | 12/2021 | Gregory | G01C 19/574 |
| 2006/0230830 A1 | 10/2006 | Geen et al. | |
| 2008/0092652 A1* | 4/2008 | Acar | G01C 19/5712 |
| | | | 73/504.02 |
| 2010/0236327 A1* | 9/2010 | Mao | G01C 19/5719 |
| | | | 73/504.12 |
| 2011/0270569 A1* | 11/2011 | Stephanou | G01C 19/5747 |
| | | | 73/514.32 |
| 2012/0210788 A1* | 8/2012 | Gunther | G01C 19/574 |
| | | | 73/504.12 |
| 2012/0279301 A1* | 11/2012 | Gunthner | G01C 19/5719 |
| | | | 73/504.12 |
| 2013/0269469 A1* | 10/2013 | Rocchi | G01C 19/04 |
| | | | 74/5 F |
| 2014/0224016 A1* | 8/2014 | Leclerc | G01C 19/5712 |
| | | | 73/504.12 |
| 2014/0260608 A1* | 9/2014 | Lin | G01C 19/5747 |
| | | | 73/504.12 |
| 2015/0000400 A1* | 1/2015 | Cazzaniga | G01C 19/5747 |
| | | | 73/504.12 |
| 2015/0204897 A1* | 7/2015 | Yamamoto | G01P 15/18 |
| | | | 73/504.12 |
| 2016/0231115 A1* | 8/2016 | Piirainen | G01C 19/5712 |
| 2017/0350701 A1* | 12/2017 | Geisberger | G01C 19/5747 |
| 2018/0058853 A1 | 3/2018 | Jia et al. | |
| 2018/0167053 A1* | 6/2018 | Ikehashi | G01C 19/574 |
| 2018/0172445 A1* | 6/2018 | Prikhodko | G01C 19/574 |
| 2018/0172446 A1* | 6/2018 | Prikhodko | G01C 19/5747 |
| 2018/0172447 A1* | 6/2018 | Prikhodko | G01C 19/574 |
| 2019/0383612 A1* | 12/2019 | Geisberger | G01C 19/5747 |
| 2020/0096337 A1* | 3/2020 | Senkal | G01C 19/5712 |
| 2020/0263987 A1* | 8/2020 | Blomqvist | G01C 19/5712 |
| 2020/0263989 A1* | 8/2020 | Blomqvist | G01C 19/574 |
| 2021/0364291 A1* | 11/2021 | Blomqvist | G01C 19/5712 |
| 2021/0372794 A1* | 12/2021 | Blomqvist | G01C 19/574 |
| 2021/0381832 A1* | 12/2021 | Prikhodko | G01C 19/5712 |
| 2021/0381833 A1* | 12/2021 | Vohra | G01C 19/5712 |
| 2022/0163329 A1* | 5/2022 | Janioud | G01C 19/5705 |
| 2022/0178693 A1* | 6/2022 | Kaajakari | G01C 19/574 |

OTHER PUBLICATIONS

Brenton R Simon et al: "Anti-Phase Mode Isolation in Tuning-Fork MEMS using a Lever Coupling Design" published in Sensors, 2012 IEEE, Oct. 28-21, 2012, 4 pages.

* cited by examiner

ANGULAR RATE SENSOR WITH CENTRALLY POSITIONED COUPLING STRUCTURES

TECHNICAL FIELD OF THE INVENTION

The present invention relates generally to microelectromechanical systems (MEMS) devices. More specifically, the present invention relates to a MEMS angular rate sensor device having multiple proof masses interconnected by centrally positioned coupling structures for in-phase motion suppression.

BACKGROUND OF THE INVENTION

An angular rate sensor, also referred to as a gyroscope, senses angular speed, rate, or velocity, also referred to as angular rate of rotation, around one or more axes. Commonly, angular rate sensors are microelectromechanical systems (MEMS) devices manufactured using MEMS technology, which provides a way to make very small mechanical structures and integrate these structures with electrical devices on a single substrate using conventional batch semiconductor processing techniques. MEMS angular rate sensors are widely used in applications such as automotive, inertial guidance systems, gaming systems, smartphones, cameras, etc.

Some prior art MEMS angular rate sensors utilize multiple vibrating structures or masses that are suspended over a substrate. Such MEMS angular rate sensors are often referred to as vibrating structure gyroscopes or Coriolis vibratory gyroscopes. One type of vibrating structure angular rate sensor is a "tuning fork" angular rate sensor having multiple masses, also referred to herein as proof masses. In operation, at least some of the proof masses, acting as drive masses, are driven to resonance in opposite directions, also referred to herein as anti-phase. In response to an external angular stimulus about an input axis, at least some of the proof masses, acting as sense masses, move in response to a Coriolis acceleration component, also referred to in the art as the Coriolis effect. Namely, antiphase movement of the sense masses in response to the Coriolis effect has an amplitude that is proportional to the angular rate of rotation of the angular rate sensor about the input axis.

A drawback of angular rate sensors is their susceptibility to common mode excitation of the proof masses in response to linear and/or angular acceleration due to an external stimulus such as shock, vibration, spurious or parasitic acceleration, etc. Common mode excitation, also referred to herein as in-phase motion, is a condition in which the Coriolis masses, operating as drive masses, sense masses, or both, move in the same direction and at the same amplitude and at a frequency (i.e., the common mode frequency) that is as low as, lower, or higher than an operating frequency of the angular rate sensor (i.e., the differential mode frequency). Common mode excitation can lead to inaccuracy or complete failure of the angular rate sensor.

SUMMARY

Aspects of the disclosure are defined in the accompanying claims.

In a first aspect, there is provided An angular rate sensor comprising a substrate having a surface; first, second, third, and fourth proof masses spaced apart from the surface of the substrate, each of the first, second, third, and fourth proof masses being configured to move along first and second transverse axes parallel to the surface; a first coupling structure interposed between and interconnecting the first and second proof masses; a second coupling structure interposed between and interconnecting the second and third proof masses; a third coupling structure interposed between and interconnecting the third and fourth proof masses; and a fourth coupling structure interposed between and interconnecting the fourth and first proof masses, wherein the first, second, third, and fourth coupling structures are configured to constrain an in-phase motion of adjacent ones of the first, second, third, and fourth proof masses along the first and second transverse axes.

In a second aspect, there is provided an angular rate sensor comprising a substrate having a surface; first, second, third, and fourth proof masses spaced apart from the surface of the substrate, each of the first, second, third, and fourth proof masses being configured to move along first and second transverse axes parallel to the surface; a first coupling structure interposed between and interconnecting the first and second proof masses; a second coupling structure interposed between and interconnecting the second and third proof masses; a third coupling structure interposed between and interconnecting the third and fourth proof masses; and a fourth coupling structure interposed between and interconnecting the fourth and first proof masses, wherein the first, second, third, and fourth coupling structures are configured to constrain an in-phase motion of the first, second, third, and fourth proof masses along the first and second transverse axes, and wherein each of the first, second, third, and fourth coupling structures comprises a first coupling portion configured to constrain the in-phase motion of the first, second, third, and fourth proof masses along one of the first and second transverse axes, the first coupling portion including a pivot structure coupled to a first sidewall of one of the first, second, third, and fourth proof masses and coupled to a second sidewall of another one of the first, second, third, and fourth proof masses, the first and second sidewalls being adjacent to one another and spaced apart from one another by a gap, and the first coupling portion including an anchor on the surface of the substrate and located in the gap between the first and second sidewalls, the anchor being coupled to a mid-point of the pivot structure; and a second coupling portion configured to constrain the in-phase motion of adjacent ones of the first, second, third, and fourth proof masses along the other of the first and second transverse axes, the second coupling portion including first and second compliant structures, wherein the first coupling portion is interposed between the first and second compliant structures.

In a third aspect, there is provided an angular rate sensor comprising a substrate having a surface; first, second, third, and fourth proof masses spaced apart from the surface of the substrate, each of the first, second, third, and fourth proof masses being configured to move along first and second transverse axes parallel to the surface; a first coupling structure interposed between and interconnecting the first and second proof masses; a second coupling structure interposed between and interconnecting the second and third proof masses; a third coupling structure interposed between and interconnecting the third and fourth proof masses; and a fourth coupling structure interposed between and interconnecting the fourth and first proof masses, wherein the first, second, third, and fourth coupling structures are configured to constrain an in-phase motion of adjacent ones of the first, second, third, and fourth proof masses along the first and second transverse axes in the absence of additional in-phase motion constraining coupling structures outside a boundary of the first, second, third, and fourth proof masses, and wherein each of the first, second, third, and fourth coupling structures comprises a first coupling portion configured to constrain the in-phase motion of the adjacent ones of the first, second, third, and fourth proof masses along one of the first and second transverse axes; and a second coupling portion configured to constrain the in-phase motion of the adjacent ones of the first, second, third, and fourth proof masses along the other of the first and second transverse axes.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns microelectromechanical systems (MEMS) angular rate sensor devices. More particularly, a MEMS angular rate sensor includes a four proof-mass architecture configured to sense angular velocity or rate about a Z-axis perpendicular to a plane of a substrate of the sensor. The four proof masses are configured to move along two axes of motion that are both in-plane relative to the substrate. Coupling structures are provided for connecting the four proof masses. In particular, the coupling structures are positioned between adjacent edges of the proof masses to form connections to each of the four proof masses only through the adjacent edges. These centrally positioned coupling structures are configured to mechanically constrain or suppress in-phase motion, also referred to herein as common mode motion, for both in-plane directions of movement of the proof masses while maintaining symmetry and reducing the potential for accelerations inducing movement through the coupling structures. Accordingly, the centrally positioned coupling structures may enable improved accuracy and robustness in a four proof-mass architecture. The four proof-mass architecture with the centrally positioned coupling structures may be configured as a frequency modulated (FM) angular rate sensor or an amplitude modulated (AM) angular rate sensor.

The instant disclosure is provided to further explain in an enabling fashion at least one embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Figure 1:
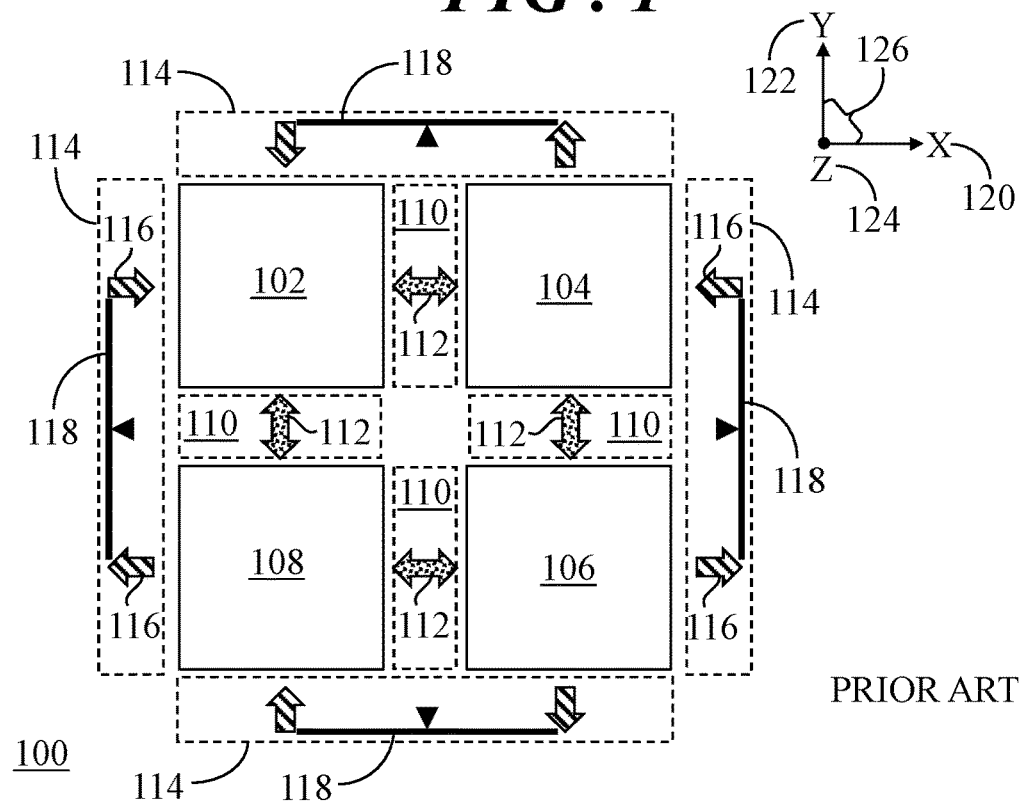
FIG. 1 shows a top schematic view of a prior art angular rate sensor.

FIG. 1 shows a top schematic view of a prior art angular rate sensor 100 demonstrating a prior art technique for rejecting in-phase motion. Angular rate sensor 100, alternatively referred to as a gyroscope, includes four movable proof masses 102, 104, 106, 108. Proof masses 102, 104 are laterally adjacent to one another and proof masses 106, 108 are laterally adjacent to one another. Additionally, proof masses 102, 108 are laterally adjacent to one another and proof masses 104, 106 are laterally adjacent to one another. This relative orientation of proof masses 102, 104, 106, 108 is substantially in the shape of a quadrangle. Together, the four proof masses 102, 104, 106, 108 may be considered a four proof mass vibratory gyroscope device.

Each of proof masses 102, 104, 106, 108 is connected to an adjacent one of proof masses 102, 104, 106, 108 through a central coupling structure 110 (generally denoted by a dashed line box). Each coupling structure 110 is configured to allow anti-phase motion (denoted by dark stippled bi-directional arrows 112) between the adjacent proof masses 102, 104, 106, 108. Another type of coupling structure 114 (generally denoted by a dashed line box) is positioned at the exterior of proof masses 102, 104, 106, 108. Coupling structures 114 are configured to prevent adjacent proof masses 102, 104, 106, 108 from moving in-phase (denoted by two oppositely facing arrows 116 interconnected by a pivot linkage 118). Thus, coupling structures 110, 114 are configured to ideally reject in-phase (e.g., common mode) motion of adjacent proof masses 102, 104, 106, 108.

In the top schematic view of FIG. 1, a three-dimensional coordinate system is represented in which an X-axis 120 is directed rightward and leftward on the page, a Y-axis 122 is directed upward and downward on the page, and a Z-axis 124 is directed into and out of the page. Together, X-axis 120 and Y-axis 122 define an X-Y plane 126. In the depicted configuration, each of proof masses 102, 104, 106, 108 is configured to undergo in-plane oscillatory linear motion along X- and Y-axes 120, 122. For example, proof masses may undergo in-plane oscillatory linear motion in a drive direction parallel to X-axis 120 and in a sense direction parallel to Y-axis 122 in response to angular rotation of angular rate sensor about Z-axis 124. For simplicity, drive actuators, sense electrodes, and the like are not shown in the schematic view of FIG. 1.

In this example, coupling structures 110, 114 are intended to enable anti-phase motion of adjacent proof masses 102, 104, 106, 108 along both of X- and Y-axes 120, 122 while concurrently limiting or preventing in-phase motion (e.g., common mode motion) of the adjacent proof masses 102, 104, 106, 108 along both of X- and Y-axes 120, 122. The position of coupling structures 114 at the exterior of proof masses 102, 104, 106, 108 is not symmetric. Coupling structures 114 are considered asymmetric because of their externally located position on the outside of a boundary circumscribing proof masses 102, 104, 106, 108. Depending upon the design details, coupling structures 114 are likely to respond to acceleration and cause erroneous movement of proof masses 102, 104, 106, 108 which, in turn, may induce an erroneous sense signal.

Figure 2:
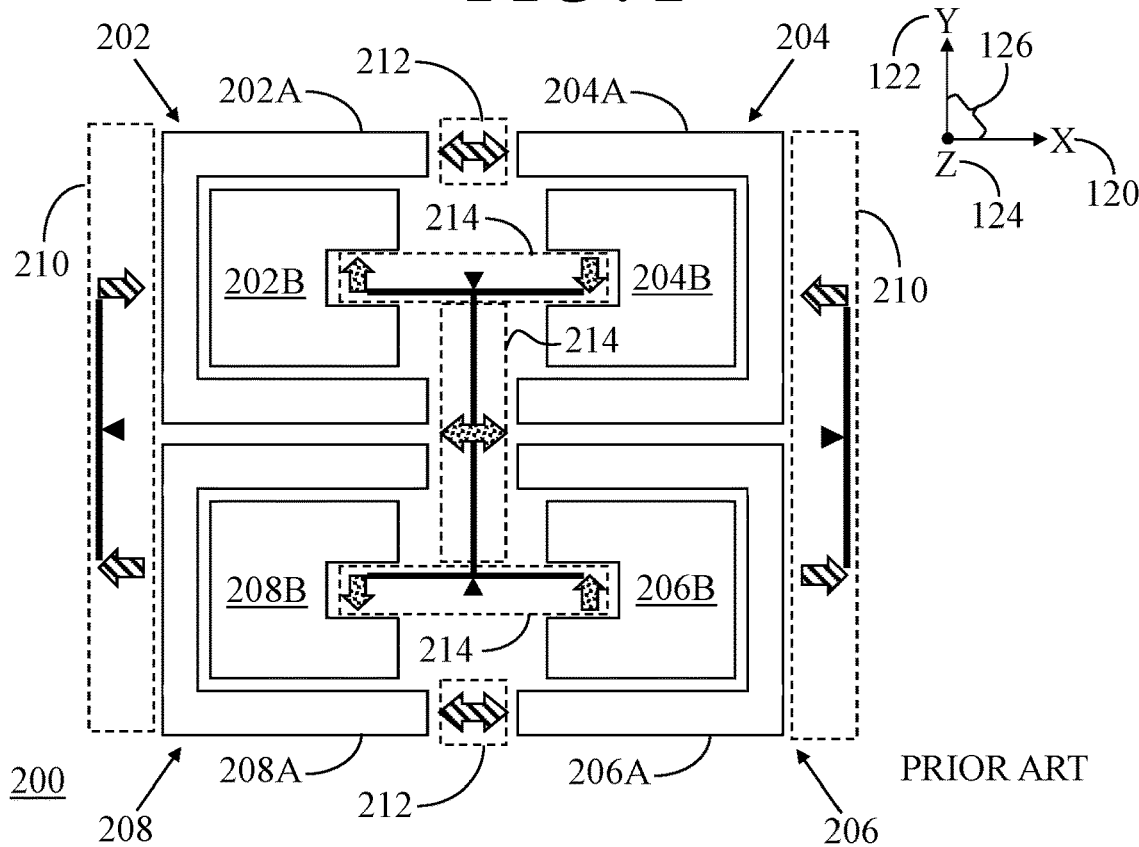
FIG. 2 shows a top schematic view of another prior art angular rate sensor.

FIG. 2 shows a top schematic view of another prior art angular rate sensor 200. Prior art angular rate sensor 200 demonstrates a second technique for common mode rejection. Angular rate sensor 200 again includes four movable proof mass 202, 204, 206, 208. In this configuration, an attempt is made to include the same four-mass in-plane common mode linking, except by breaking each of proof masses 202, 204, 206, 208 into an outer portion 202A, 204A, 206A, 208A, respectively, and an inner portion 202B, 204B, 206B, 208B.

Outer portions 202A, 208A are linked via an exterior positioned coupling structure 210 (generally denoted by a dashed line box). Likewise, outer portions 204A, 206A are linked via another exterior positioned coupling structure 210. Coupling structures 210 are configured to prevent adjacent outer portions 202A, 208A of proof masses 202, 208, as well as the adjacent outer portions 204A, 206A of proof masses 204, 206, from moving in-phase. Additionally, a coupling structure 212 links outer portions 202A and 204A, and another coupling structure 212 links outer portions 206A, 208A. Coupling structures 212 are configured to prevent outer portions 202A, 204A, as well as outer portions 206A, 208A, from moving in-phase. Inner portions 202B, 204B, 206B, 208B of proof masses 202, 204, 206, 208 are then connected through another coupling structure 214 (generally denoted by dashed line boxes). Coupling structures 210, 212 are intended to link motion parallel to X-axis 120 and coupling structures 214 are intended to link motion parallel to Y-axis 122. In this configuration both of coupling structures 212, 214 have asymmetries that make them prone to creating an erroneous sense signal in response to linear acceleration, thereby defeating one purpose of the coupling structures 210, 212, 214.

In accordance with embodiments described below, coupling structures for common mode rejection are positioned only along the interior edges of adjacent proof masses in a four-proof mass architecture. These interior positioned coupling structures are configured to be symmetric to minimize movement of the proof masses when subject to linear acceleration. Thus, a more accurate and robust angular rate sensor architecture may be achieved. Further, the design of the four-proof mass architecture with interior positioned coupling structures may be configured for usage in both frequency and amplitude modulated angular rate sensors.

Figure 3:
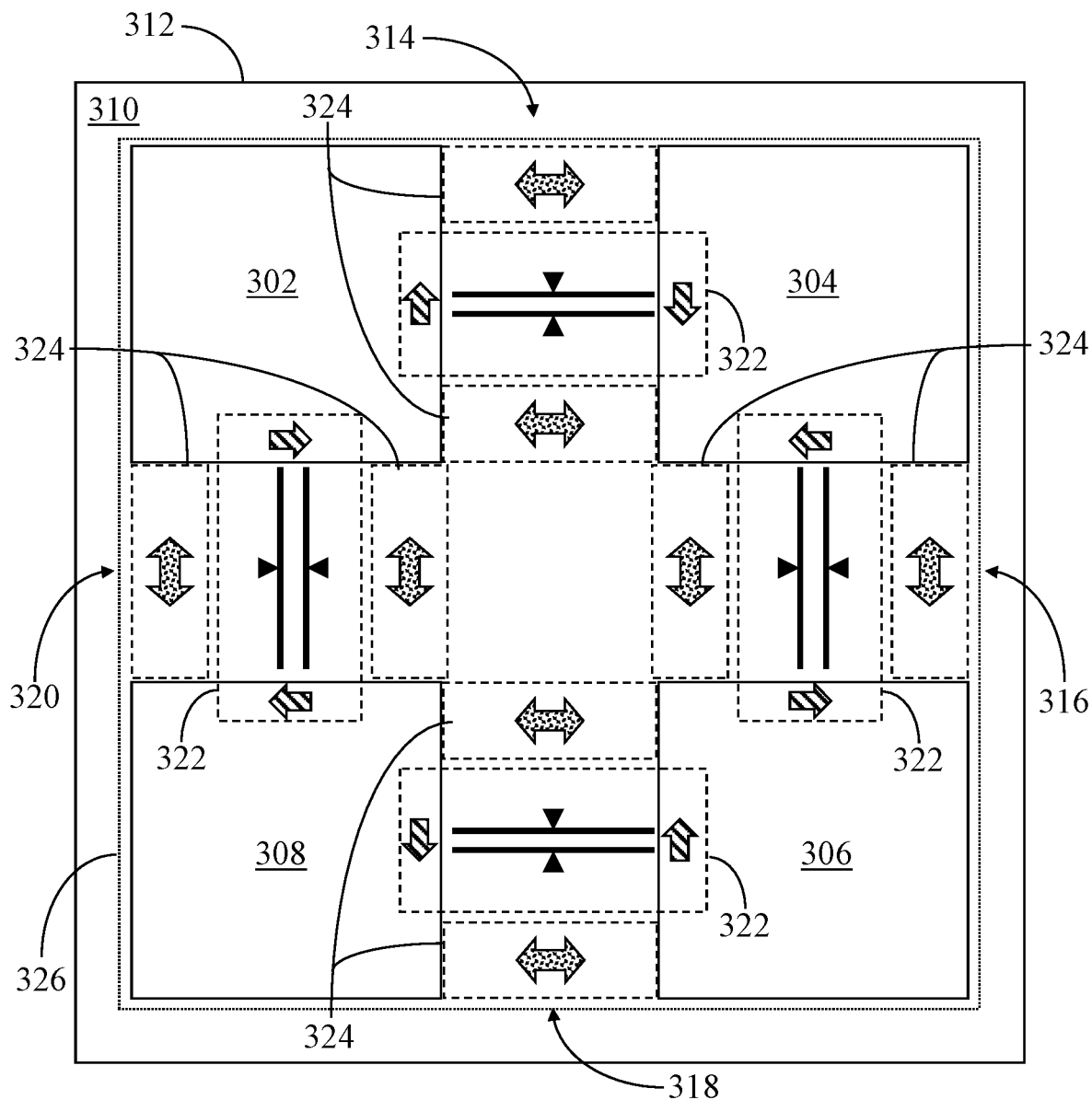
FIG. 3 shows a top schematic view of an angular rate sensor in accordance with an embodiment.

Referring now to FIG. 3, FIG. 3 shows a top schematic view of an angular rate sensor 300 in accordance with an embodiment. Angular rate sensor 300, alternatively referred to as a gyroscope, includes first, second, third, and fourth proof masses 302, 304, 306, 308 spaced apart from a surface 310 of a substrate 312. First and second proof masses 302, 304 are laterally adjacent to one another and third and fourth proof masses 306, 308 are laterally adjacent to one another. Additionally, first and fourth proof masses 302, 308 are laterally adjacent to one another and second and third proof masses 304, 306 are laterally adjacent to one another. This relative orientation of first, second, third, and fourth proof masses 302, 304, 306, 308 is substantially in the shape of a quadrangle. Together, first, second, third, and fourth proof masses 302, 304, 306, 308 may be considered a four proof mass vibratory gyroscope device.

Each of first, second, third, and fourth proof masses 302, 304, 306, 308 is configured to move along first and second transverse axes parallel to surface 310 of substrate 312. More particularly, each of first, second, third, and fourth proof masses 302, 304, 306, 308 is configured undergo in-plane oscillatory linear motion along both of X- and Y-axes 120, 122. Drive actuators, sense electrodes, and the like are not shown in the schematic view of FIG. 3 for simplicity of illustration.

A first coupling structure 314 is interposed between and interconnects first and second proof masses 302, 304. A second coupling structure 316 is interposed between and interconnects second and third proof masses 304, 306. A third coupling structure 318 is interposed between and interconnects third and fourth proof masses 306, 308. And, a fourth coupling structure 320 is interposed between and interconnects fourth and first proof masses 308, 302. First, second, third, and fourth coupling structures 314, 316, 318, and 320 are configured to enable anti-phase motion of adjacent proof masses 302, 304, 306, 308 while constraining an in-phase (e.g., common mode) motion of the adjacent first, second, third, and fourth proof masses 302, 304, 306, 308 along X- and Y-axes 120, 122.

Each of first, second, third, and fourth coupling structures 314, 316, 318, and 320 includes a first coupling portion 322 (denoted by a dashed line box) configured to constrain (e.g., reject, limit, or prevent) the in-phase motion of adjacent ones of first, second, third, and fourth proof masses 302, 304, 306, 308 along one of X- and Y-axes 120, 122 and a second coupling portion 324 (denoted by two dashed line boxes) configured to constrain (e.g., reject, limit, or prevent) the in-phase motion of adjacent ones of first, second, third, and fourth proof masses 302, 304, 306, 308 along the other of X- and Y-axes 120, 122.

In the example shown, for first coupling structure 314, first coupling portion 322 constrains in-phase motion of first and second proof masses 302, 304 along Y-axis 122 and second coupling portion 324 constrains in-phase motion of first and second proof masses 302, 304 along X-axis 120. For second coupling structure 316, first coupling portion 322 constrains in-phase motion of second and third proof masses 304, 306 along X-axis 120 and second coupling portion 324 constrains in-phase motion of second and third proof masses 304, 306 along Y-axis 122. For third coupling structure 318, first coupling portion 322 constrains in-phase motion of third and fourth proof masses 306, 308 along Y-axis 122 and second coupling portion 324 constrains in-phase motion of third and fourth proof masses 306, 308 along X-axis 120. For fourth coupling structure, 320, first coupling portion 322 constrains in-phase motion of fourth and first proof masses 308, 302 along X-axis 120 and second coupling portion 324 constrains in-phase motion of fourth and first proof masses 308, 302 along Y-axis 122. Thus, first, second, third, and fourth coupling structures 314, 316, 318, 320 are configured to prevent or reject in-phase (e.g., common mode) motion of adjacent ones of first, second, third, and fourth proof masses 302, 304, 306, 308.

In accordance with embodiments discussed herein, first, second, third, and fourth coupling structures 314, 316, 318, and 320 effectively constrain the in-phase motion of adjacent first, second, third, and fourth proof masses 302, 304, 306, 308 in the absence of additional in-phase motion constraining coupling structures (e.g., coupling structures 114, 210 of the prior art) outside a boundary 326 (denoted by a dotted line box) circumscribing first, second, third, and fourth proof masses 302, 304, 306, 308. An example embodiment of a coupling structure will be discussed in connection with FIG. 4, an example embodiment of the first coupling portion will be discussed in connection with FIG. 5, and an example embodiment of the second coupling portion will be discussed in connection with FIG. 6.

Figure 4:
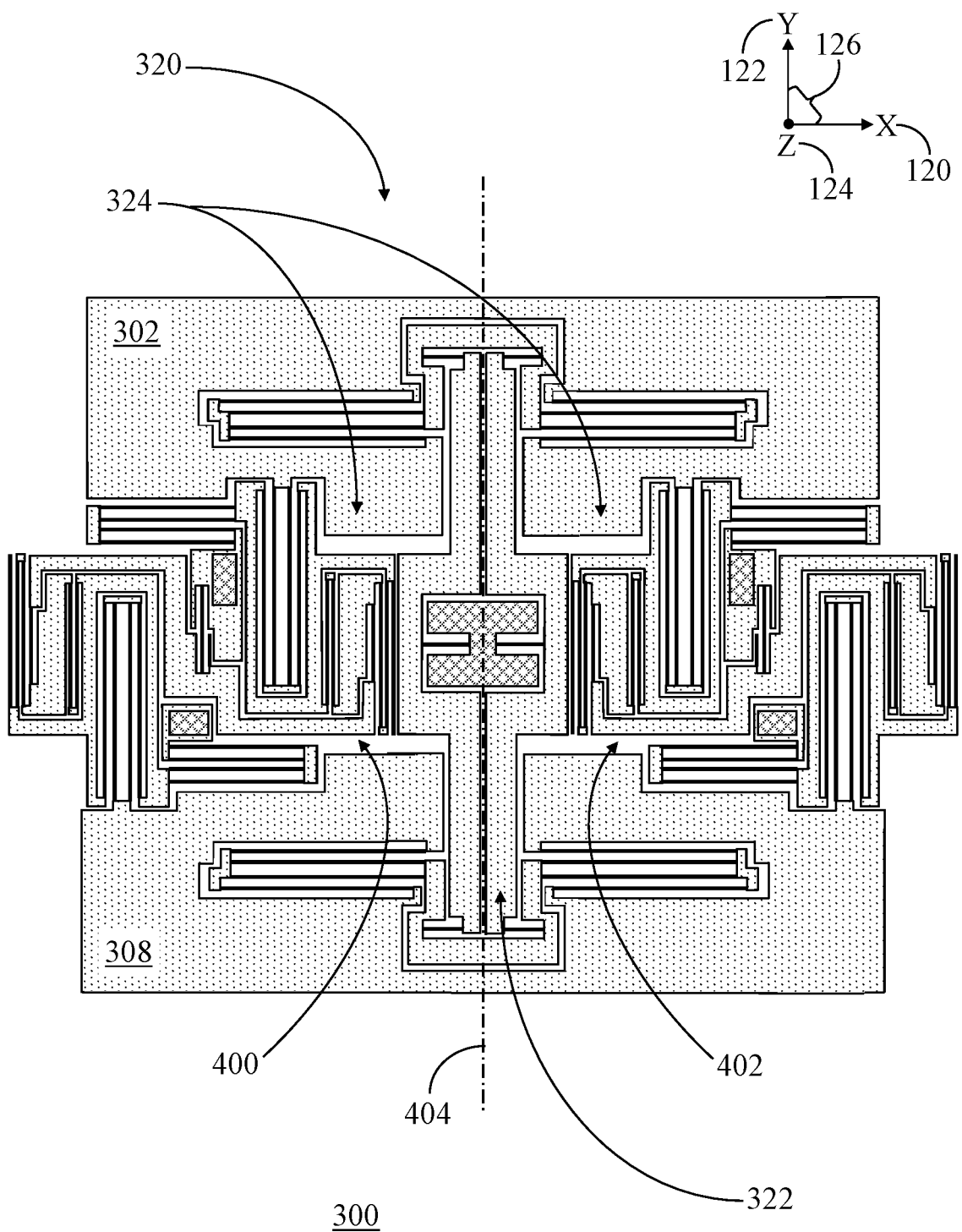
FIG. 4 shows a top view of a portion of the angular rate sensor of FIG. 3 including a coupling structure interposed between adjacent proof masses.

FIG. 4 shows a top view of a portion of angular rate sensor 300 including a coupling structure interposed between adjacent proof masses. More particularly, the example of FIG. 4 shows fourth coupling structure 320 interposed between and interconnecting first and fourth proof masses 302, 308. It should be understood that the following discussion of the structural elements of fourth coupling structure 320 applies equivalently to first, second, and third coupling structures 314, 316, 318. As shown, fourth coupling structure 320 includes first coupling portion 322 configured to constrain or reject in-phase motion of first and fourth proof masses 302, 308 along X-axis, and second coupling portion 324 configured to constrain or reject in-phase motion of first and fourth proof masses along Y-axis 122.

In accordance with an embodiment, second coupling portion 324 includes first and second compliant structures 400, 402, with first coupling portion 322 being interposed between first and second compliant structures 400, 402. Further, first and second compliant structures 400, 402 are arranged in reflection symmetry relative to an axis of symmetry 404 aligned with and centered at first coupling portion 322. Reflection symmetry, or mirror symmetry, is symmetry with respect to reflection. In this scenario, second compliant structure 402 represents a reflection of first compliant structure 400 relative to axis of symmetry 404. Thus, first and second compliant structures 402, 404 yield a symmetric configuration of second coupling portion 324 that is configured to minimize movement of the proof masses when subject to linear acceleration.

Figure 5:
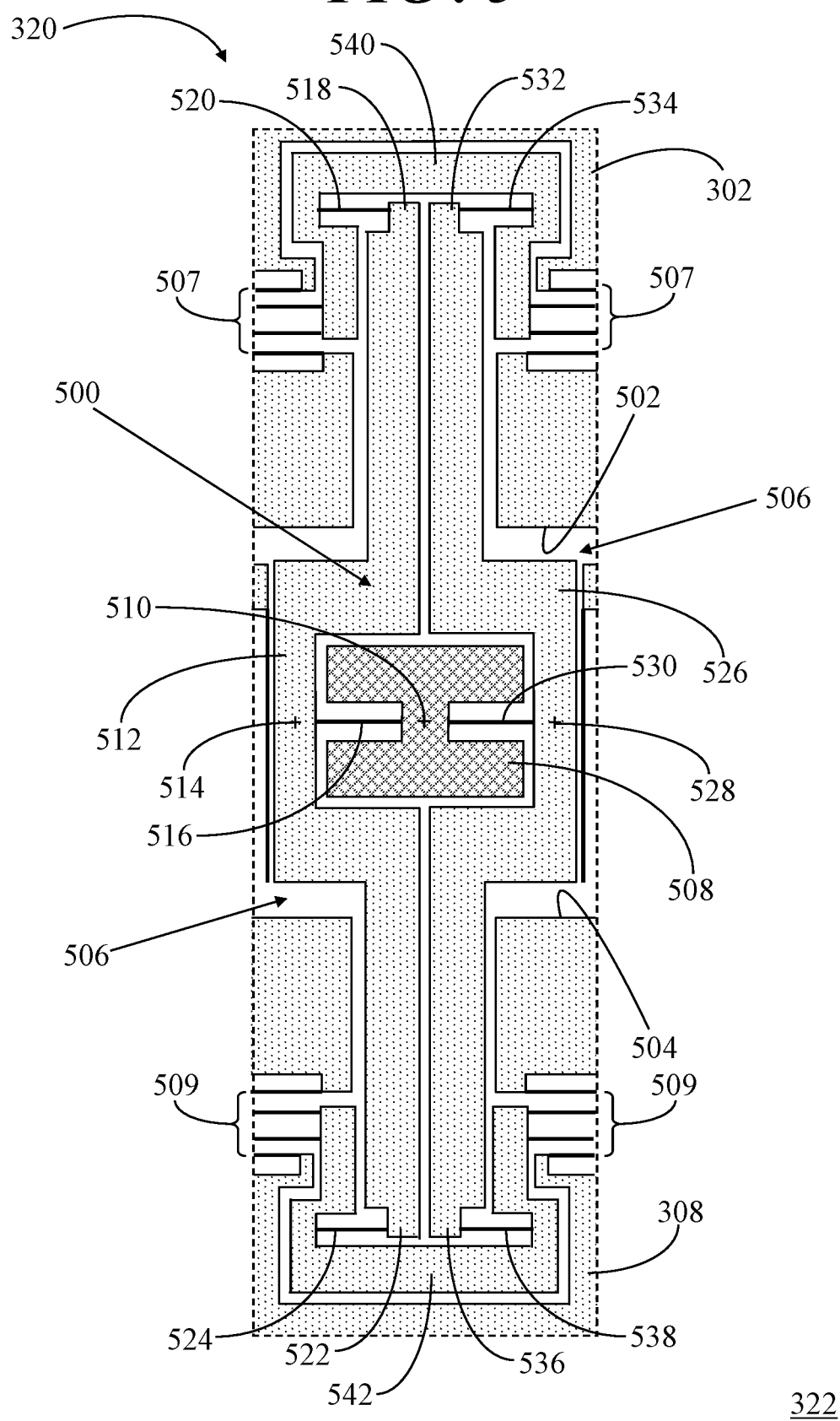
FIG. 5 shows an enlarged top view of a first coupling portion of the coupling structure of FIG. 4.
Figure 6:
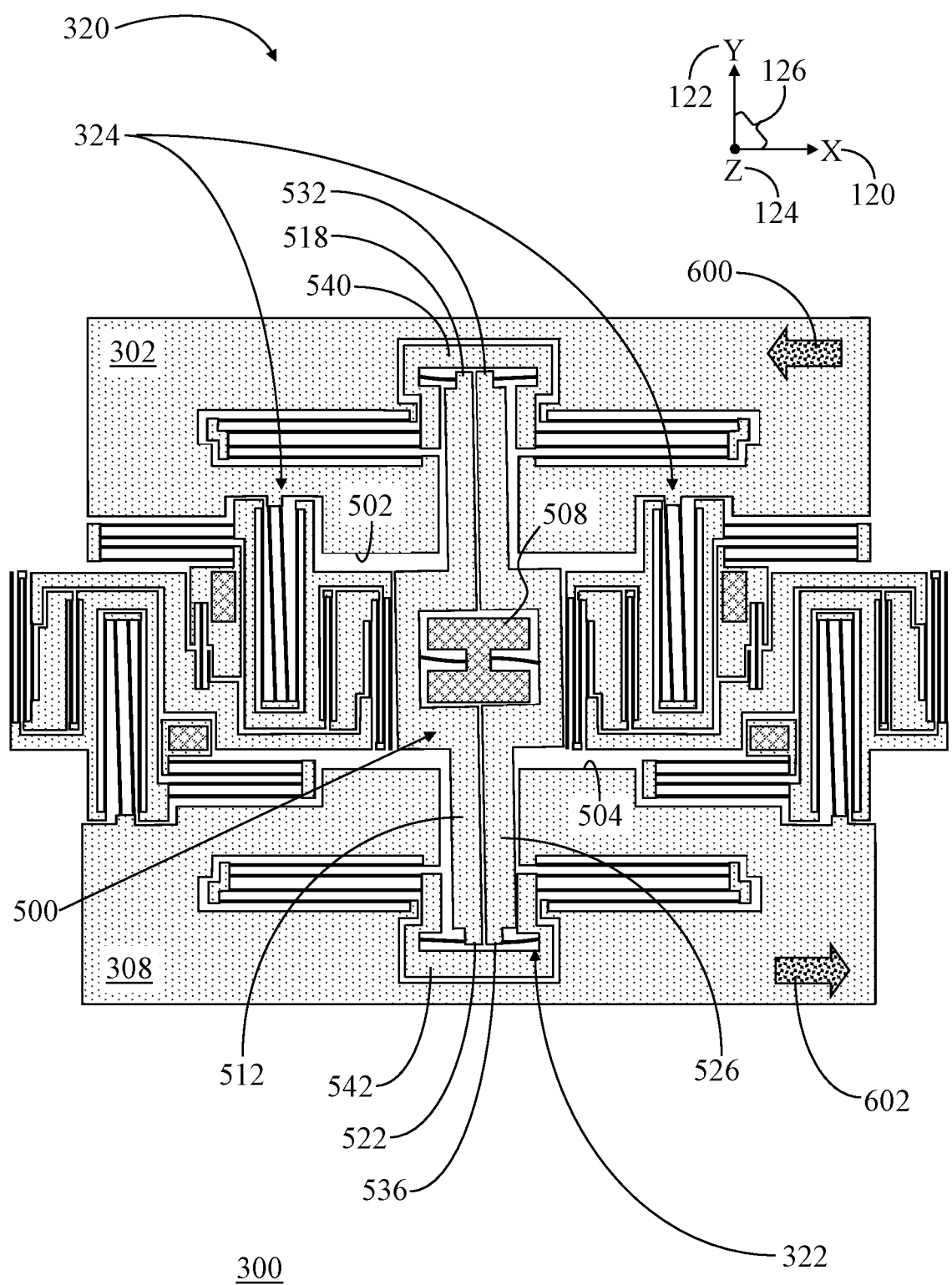
FIG. 6 shows a top view of a portion of the angular rate sensor of FIG. 3 with the coupling structure enabling anti-phase motion of two proof masses in a first direction of motion.

Referring now to FIG. 5, and 6, FIG. 5 shows an enlarged top view of first coupling portion 322 that may be implemented in any of first, second, third, and fourth coupling structures 314, 316, 318, 320 of angular rate sensor 300 and FIG. 6 shows a top view of a portion of angular rate sensor 300 with the coupling structure enabling anti-phase motion of two proof masses in a first direction of motion. For consistency in connection with the description of FIG. 4, first coupling portion 322 is described in connection with fourth coupling structure 320 interposed between first and fourth proof masses 302, 308. It should be understood, however, that the ensuing description of first coupling portion 322 also applies equivalently to first coupling portion 322 of first, second, and third coupling structures 314, 316, 318 (FIG. 3) and the respective anti-phase motion of adjacent first, second, third, and fourth proof masses 302, 304, 306, 308 as described above.

In an embodiment, first coupling portion 322 includes a pivot structure 500 coupled to a first sidewall 502 of one of first, second, third, and fourth proof masses 302, 304, 306, 308 and coupled to a second sidewall 504 of another one of the first, second, third, and fourth proof masses 302, 304, 306, 308, the first and second sidewalls 502, 504 being adjacent to one another and spaced apart from one another by a gap 506. In this example, pivot structure 500 may be coupled to first sidewall 502 via a spring system 507 and pivot structure 500 may be coupled to second sidewall 504 via another spring system 509. First coupling portion 322 further includes an anchor 508 on surface 310 of substrate 312 and located in gap 506 between first and second sidewalls 502, 504. Anchor 508 is coupled to a midpoint 510 of pivot structure 500.

In some embodiments, pivot structure 500 includes a first pivot bar 512 having a first mid-point 514 coupled to anchor 508 by a first spring 516, a first end 518 coupled to first sidewall 502 via a second spring 520, and a second end 522 coupled to second sidewall 504 via a third spring 524. Pivot structure 500 additionally includes a second pivot bar 526 adjacent to first pivot bar 512 and having a second mid-point 528 coupled to anchor 508 by a fourth spring 530, a third end 532 coupled to first sidewall 502 via a fifth spring 534, and a fourth end 536 coupled to second sidewall 504 via a sixth spring 538. In this example, second and fifth springs 520, 534 may be connected to opposing ends of a third bar structure 540, which in turn is connected to spring system 507. Similarly, third and sixth springs 524, 538 may be connected to opposing ends of a fourth bar structure 542, which in turn is connected to spring system 508. Together, first and second pivot bars 512, 526 with third and fourth bar structures 540, 542 may yield a four-bar linkage between adjacent first and fourth proof masses 302, 308 to restrict undesired rotations of first and fourth proof masses 302, 308 about Z-axis 124 and to preserve system symmetry.

As demonstrated in FIG. 6, pivot structure 500 is configured to move flexibly about anchor 508 such that the opposite ends of pivot structure 500 move in opposite directions to enable first and second sidewalls 502, 504 of the adjacent proof masses to move past one another in opposing directions (as denoted by arrows 600, 602 pointing in opposite directions). In this dual pivot bar example, first and third ends 518, 532 of first and second pivot bars 512, 526 coupled to first sidewall 502 are opposite second and fourth ends 522, 536 of first and second pivot bars 512, 526 coupled to second sidewall 504. Thus, pivot structure 500 ensures that first and fourth proof masses 302, 308 move anti-phase (e.g., move in opposite directions) parallel to X-axis 120 and thereby constrains or prevents in-phase (common mode) motion of first and fourth proof masses 302, 308.

Figure 7:
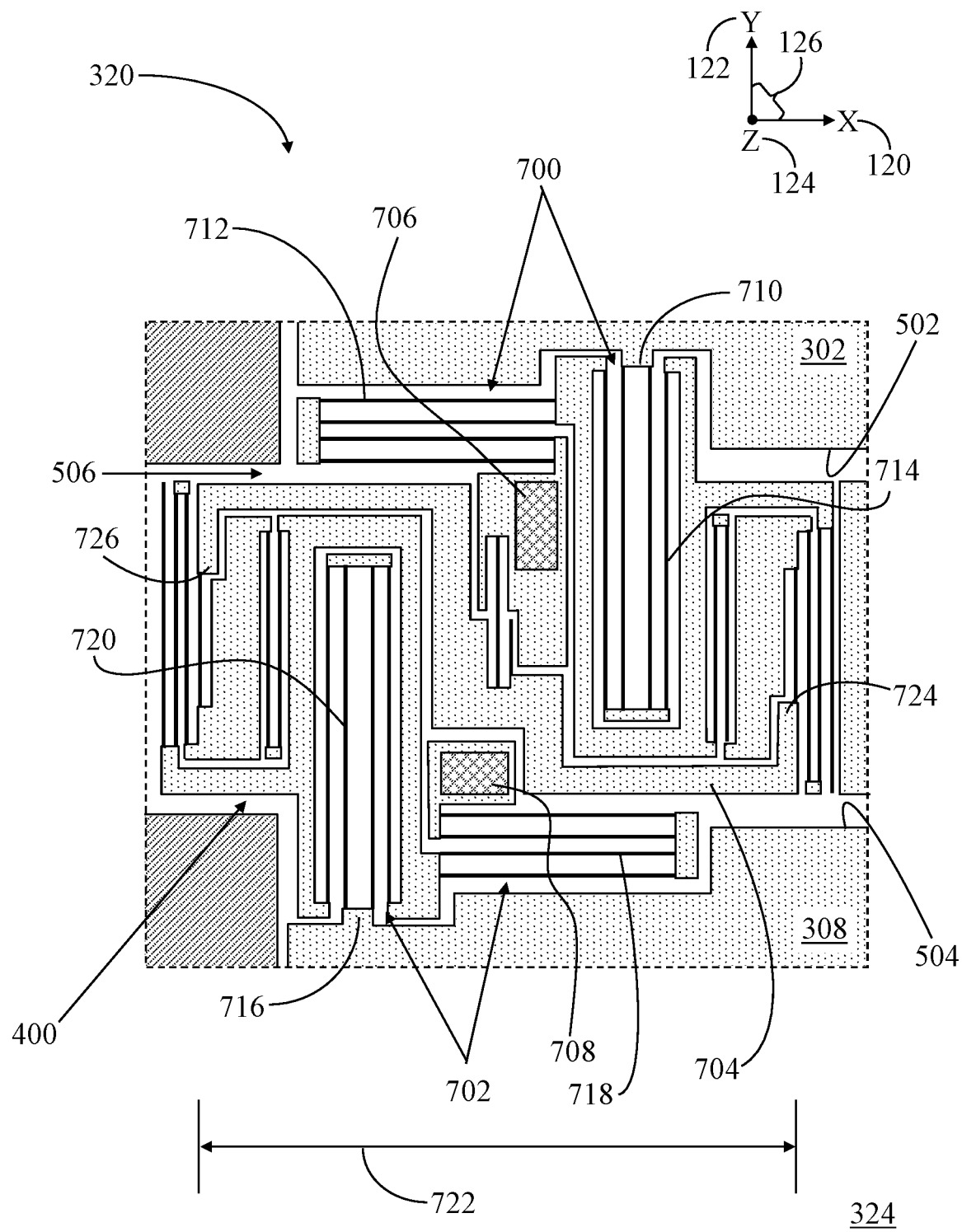
FIG. 7 shows an enlarged top view of a first compliant structure of a second coupling portion of the coupling structure of FIG. 4.
Figure 8:
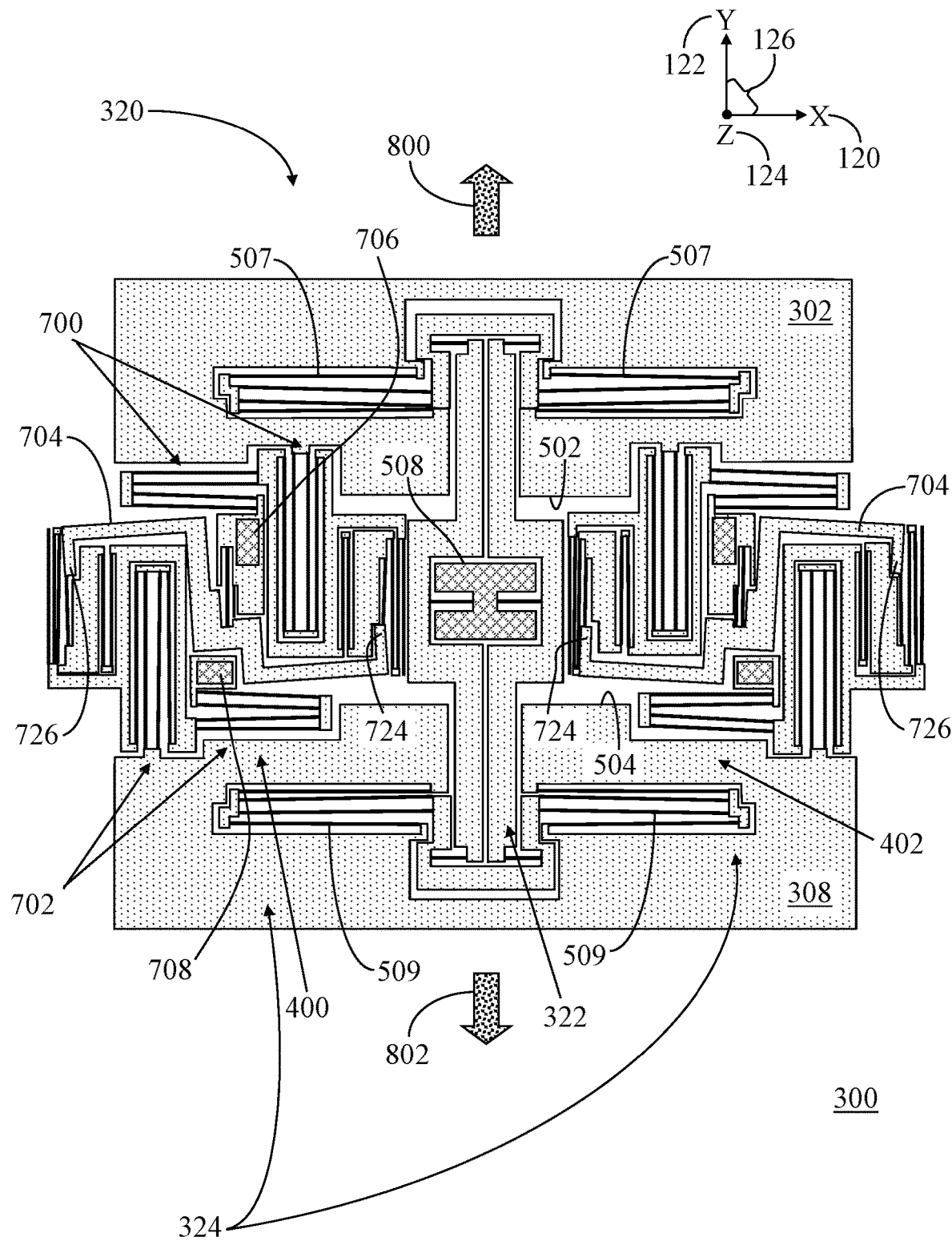
FIG. 8 shows a top view of a portion of the angular rate sensor of FIG. 3 with the coupling structure of FIG. 3 enabling anti-phase motion of two proof masses in a second direction of motion.

With reference to FIGS. 7 and 8, FIG. 7 shows an enlarged top view of first compliant structure 400 of second coupling portion 324 that may be implemented in any of first, second, third, and fourth coupling structures 314, 316, 318, 320 of angular rate sensor 300 and FIG. 8 shows of a portion of angular rate sensor 300 with the coupling structure enabling anti-phase motion of two proof masses in a second direction of motion. Again for consistency in connection with the description of FIG. 4, first compliant structure 400 of second coupling portion 324 is shown in FIG. 7 in connection with fourth coupling structure 320 interposed between first and fourth proof masses 302, 308. It should be understood, however, that the ensuing description of first compliant structure 400 applies equivalently to second compliant structure 402. Additionally, the ensuing description of second coupling portion 324 also applies equivalently to second coupling portion 324 of first, second, and third coupling structures 314, 316, 318 (FIG. 3) and the respective anti-phase motion of adjacent first, second, third, and fourth proof masses 302, 304, 306, 308 as described above.

In an embodiment, first compliant structure 400 is coupled to first sidewall 502 of one of first, second, third, and fourth proof masses 302, 304, 306, 308 and coupled to second sidewall 504 of another one of the first, second, third, and fourth proof masses 302, 304, 306, 308, the first and second sidewalls 502, 504 being adjacent to one another and spaced apart from on another by gap 506. Likewise, second compliant structure 402 (arranged in mirror symmetry relative to first compliant structure 400) is also coupled to first sidewall 502 of one of first, second, third, and fourth proof masses 302, 304, 306, 308 and is coupled to second sidewall 504 of another one of the first, second, third, and fourth proof masses 302, 304, 306, 308.

In some embodiments, each of first and second compliant structures 400, 402 includes a first spring section 700, a second spring section 702, a lever element 704, and anchors 706, 708 on surface 310 (FIG. 3) of substrate 312 (FIG. 3) in gap 506. First spring section 700 has a first end 710 coupled to first sidewall 502 and spring structures 712, 714 that enable first spring section 700 to be compliant in two directions (e.g., along each of X- and Y-axes 120, 122) parallel to surface 310 of substrate 312. Likewise, second spring section 702 has a second end 716 coupled to second sidewall 504 and spring structures 718, 720 that enable second spring section 702 to be compliant in two directions (e.g., along each of X- and Y-axes 120, 122) parallel to surface 310 of substrate 312. As shown, additional spring structures may be implemented to interconnect lever element 704 with each of first and second spring sections 700, 702 to enable suitable compliance along X- and Y-axes 120, 122. Lever element 704 has a length 722 that is generally aligned with first and second sidewalls 502, 504. Lever element 704 has a first lever end 724 coupled to first spring section 700 and a second lever end 726 coupled to second spring section 702. Anchor 706 is coupled to first spring section 700 and anchor 708 is coupled to second spring section 702.

As demonstrated in FIG. 8, each lever element 704 of first and second compliant structures 400, 402 is configured to rotate such that first and second lever ends 724, 726 are configured to move in opposite direction. Further, lever element 704 of first compliant structure 400 pivots in an opposite direction to lever element 704 of second compliant structure 402. First and second spring sections 700, 702 of each of first and second compliant structures 400, 402 are configured to suitably flex to enable first and second sidewalls 502, 504 to move in phase opposition relative to one another (as denoted by arrows 800, 802 (pointing in opposite directions).

Thus, first and second compliant structures 400, 402 of second coupling portion 324 ensure that first and fourth proof masses 302, 308 move anti-phase (e.g., move in opposite directions) parallel to Y-axis 122 and thereby constrain or prevent in-phase (common mode) motion of first and fourth proof masses 302, 308. Additionally, the mirror symmetry of first and second compliant structures 400, 402 may serve to restrict undesired rotations of first and fourth proof masses 302, 308 about Z-axis 124. Further, first coupling portion 322 does not move due to its connection to surface 310 of substrate 312 via anchor 508 and the deflection of spring systems 507, 509.

Accordingly, the central positioning of first and second coupling portions 322, 324 of respective first, second, third, and fourth coupling structures 314, 316, 318, 320 between adjacent sidewalls 502, 504 of first, second, third, and fourth proof masses 302, 304, 306, 308 enable anti-phase motion of the adjacent proof masses 302, 304, 306, 308 along X- and Y-axes 120, 122 while constraining or preventing in-phase motion of the adjacent proof masses 302, 304, 306, 308 when subject to linear accelerations. Further, the symmetry of first and second coupling portions 322, 324 may limit or prevent undesired rotations about Z-axis 124. Consequently, the centrally positioned coupling structures may enable improved accuracy and robustness in a four proof-mass architecture. This four proof-mass architecture with the centrally positioned coupling structures may be configured as a frequency modulated (FM) angular rate sensor or an amplitude modulated (AM) angular rate sensor, as discussed below in connection with FIGS. 9 and 10.

Figure 9:
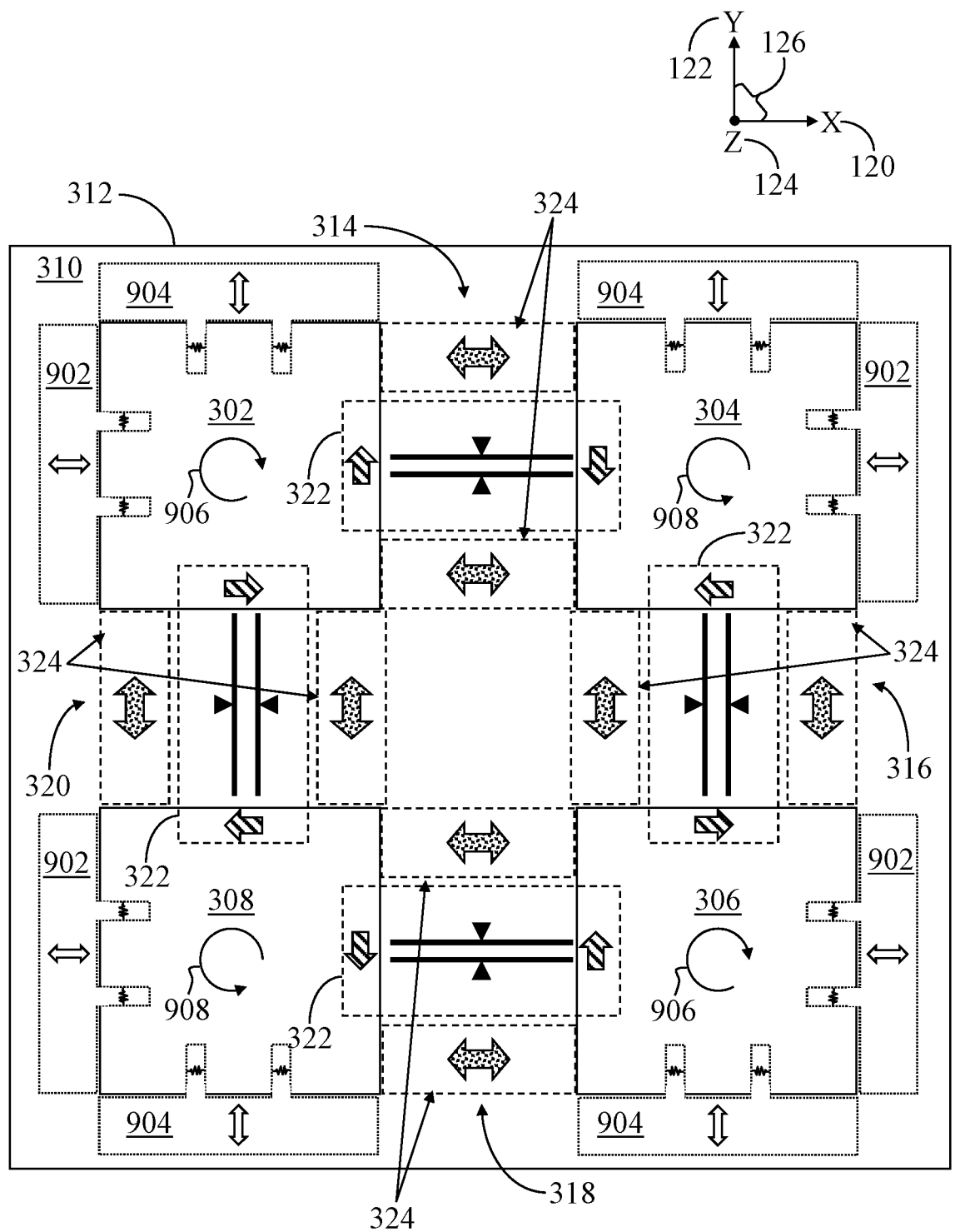
FIG. 9 shows a top schematic view of an angular rate sensor configured as a frequency modulated (FM) angular rate sensor.

Referring now to FIG. 9, FIG. 9 shows a top schematic view of a frequency modulated (FM) angular rate sensor 900 in accordance with an embodiment. In an example, FM angular rate sensor 900 is sensitive to angular velocity about Z-axis 124 oriented perpendicular to surface 310 of substrate 312. FM angular rate sensor 900 incorporates many of the elements described in detail above in connection with angular rate sensor 300. Thus, the same reference numerals will be utilized for equivalent elements. As such, angular rate sensor 900 includes adjacent first, second, third, and fourth proof masses 302, 304, 306, 308 spaced apart from surface 310 of substrate 312 and oriented in the shape of a quadrangle to form a four proof mass vibratory gyroscope device. First, second, third, and fourth coupling structures 314, 316, 318, and 320 are interposed between and interconnect respective adjacent first, second, third, and fourth proof masses 302, 304, 306, 308. And, as discussed in detail above, each of first, second, third, and fourth coupling structures 314, 316, 318, 320 include first coupling and second coupling portions 322, 324.

Again, each of first, second, third, and fourth proof masses 302, 304, 306, 308 is configured to undergo in-plane oscillatory linear motion along both of X- and Y-axes 120, 122. In the illustrated example, FM angular rate sensor 900 includes first drive actuators 902 configured to enable drive motion of first, second, third, and fourth proof masses 302, 304, 306, 308 along X-axis 120 and second drive actuators 904 configured to enable drive motion of first, second, third, and fourth proof masses 302, 304, 306, 308 along Y-axis 122. First and second drive actuators 902, 904 may include any known or upcoming configuration of fixed and movable electrode elements. Thus, first and second drive actuators 902, 904 are represented by dotted line boxes for simplicity of illustration.

First and second drive actuators 902, 904 are actuated to enable motion of first, second, third, and fourth proof masses 302, 304, 306, 308 along both of X- and Y-axes 120, 122 concurrently, which causes each proof mass to follow a circular trajectory at a desired drive frequency. The phase of motion along both of the X- and Y-axes 120, 122 will control the direction of rotation. For demonstration purposes in FIG. 9, at a given instant in time first and third proof masses 302, 306 are driven in a first orbital drive direction 906 (denoted by arrows) and second and fourth proof masses 304, 308 are driven in a second orbital drive direction 908 (denoted by arrows) that is opposite from first orbital drive direction 906. Of course, first and second drive directions 906, 908 change in accordance with the drive frequency so that second and fourth proof masses 304, 308 are driven anti-phase relative to first and third proof masses 302, 306. However, the configuration of coupling structures 314, 316, 318, 320 results in the rejection of in-phase motion of adjacent ones of first, second, third, and fourth proof masses 302, 304, 306, 308.

When a frequency modulated angular rate sensor is subjected to angular velocity about Z-axis 124, the frequency of the circular orbit of first, second, third, and fourth proof masses 302, 304, 306, 308 will undergo a frequency change in response to the angular velocity. The frequency change of the circular orbit of first, second, third, and fourth proof masses 302, 304, 306, 308 may be compared with that of a reference frequency. Accordingly, the "drive" and the "sense" are now two driven motions creating a circular orbiting mass (e.g., first, second, third, and fourth proof masses 302, 304, 306, 308). Each oscillation may be locked with a phase lock loop (PLL) to track frequency changes and the change in phase between the controlled oscillations to yield the angular velocity.

Figure 10:
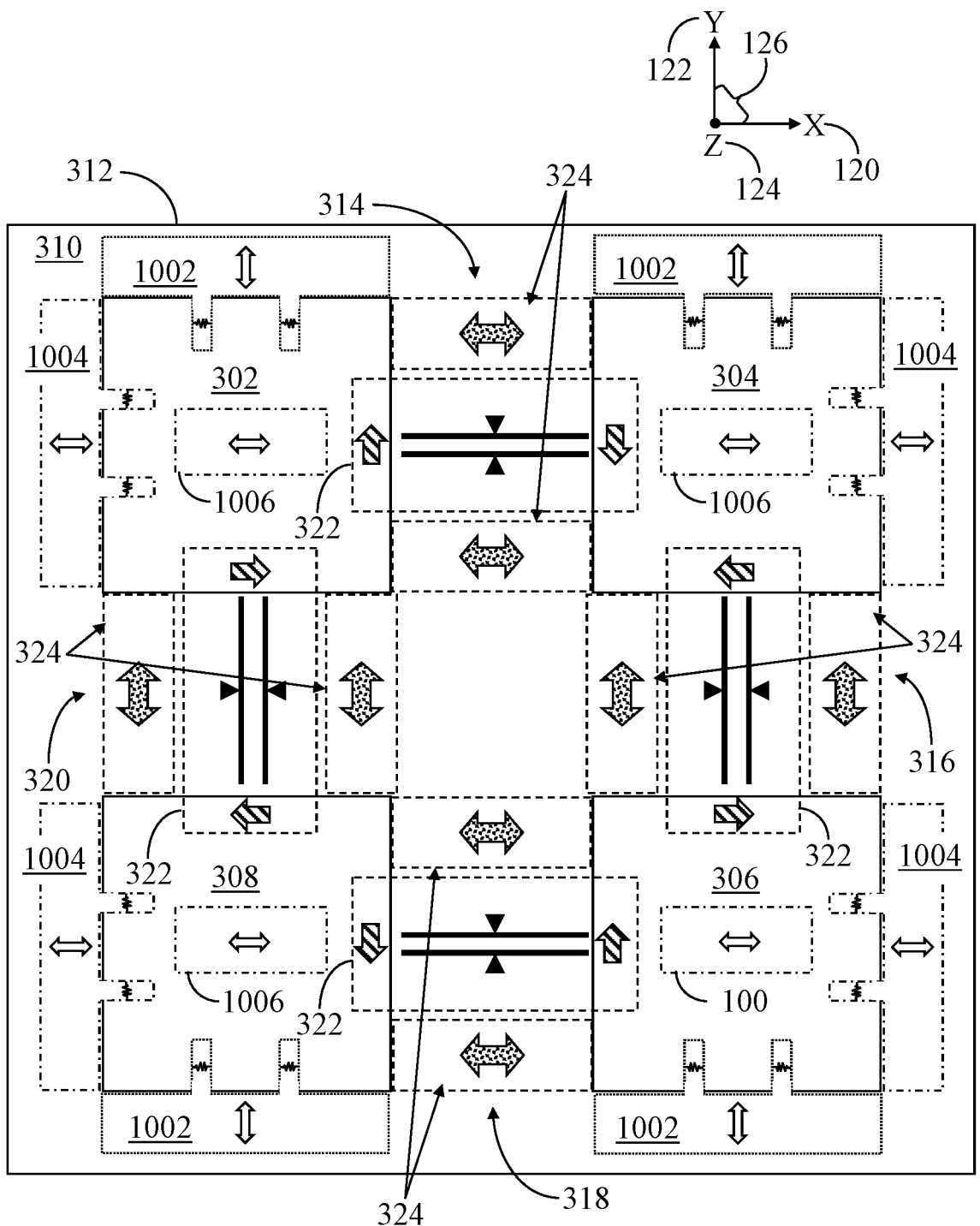
FIG. 10 shows a top schematic view of an angular rate sensor configured as an amplitude modulated (AM) angular rate sensor.

FIG. 10 shows a top schematic view of an amplitude modulated (AM) angular rate sensor 1000 in accordance with another embodiment. In an example, AM angular rate sensor 1000 is sensitive to angular velocity about Z-axis 124 oriented perpendicular to surface 310 of substrate 312. AM angular rate sensor 1000 incorporates many of the elements described in detail above in connection with angular rate sensors 300, 900. Thus, the same reference numerals will be utilized for equivalent elements. As such, angular rate sensor 1000 includes adjacent first, second, third, and fourth proof masses 302, 304, 306, 308 spaced apart from surface 310 of substrate 312 and oriented in the shape of a quadrangle to form a four proof mass vibratory gyroscope device. First, second, third, and fourth coupling structures 314, 316, 318, and 320 are interposed between and interconnect respective adjacent first, second, third, and fourth proof masses 302, 304, 306, 308. And, as discussed in detail above, each of first, second, third, and fourth coupling structures 314, 316, 318, 320 include first coupling and second coupling portions 322, 324.

Again, each of first, second, third, and fourth proof masses 302, 304, 306, 308 is configured to undergo in-plane oscillatory linear motion along both of X- and Y-axes 120, 122. In the illustrated example, AM angular rate sensor 1000 includes drive actuators 1002 configured to enable drive motion of first, second, third, and fourth proof masses 302, 304, 306, 308 along Y-axis 122. Drive actuators 1002 may include any known or upcoming configuration of fixed and movable electrode elements. Thus, drive actuators 1002 are represented by dotted line boxes for simplicity of illustration.

Drive actuators 1002 are actuated to enable oscillatory drive motion of first, second, third, and fourth proof masses 302, 304, 306, 308 parallel to Y-axis 122. Again, adjacent ones of first, second, third, and fourth proof masses 302, 304, 306, 308 are driven in phase opposition (e.g., anti-phase) relative to one another. In response to angular velocity about the sense axis, e.g., Z-axis 124, the angular velocity is sensed as a Coriolis force in a direction parallel to X-axis 120. That is, first, second, third, and fourth proof masses 302, 304, 306, 308 will undergo oscillatory sense motion parallel to X-axis 120 in response to Z-axis angular velocity. This oscillatory sense motion may be detected at externally positioned sense electrodes 1004 and/or at internally positioned sense electrodes 1006. External and/or internal sense electrodes 1004, 1006 may include any known or upcoming configuration of fixed and movable electrode elements. Thus, external and internal sense electrodes 1004, 1006 are represented by dash-dot-dash boxes for simplicity of illustration.

As such, AM angular rate sensor 1000 has one direction of drive motion along Y-axis 122 with the drive motion of first and third proof masses 302, 306 oscillating anti-phase relative to second and fourth proof masses 304, 308. Additionally, AM angular rate sensor 100 has one direction of sense motion along X-axis 120 with the sense motion of first and third proof masses 302, 306 oscillating anti-phase relative to second and fourth proof masses 304, 308. Again, the configuration of coupling structures 314, 316, 318, 320 results in the rejection of in-phase motion of adjacent ones of first, second, third, and fourth proof masses 302, 304, 306, 308.

Embodiments described herein entail MEMS angular rate sensor devices. More particularly, a MEMS angular rate sensor includes a four proof-mass architecture configured to sense angular velocity or rate about a Z-axis perpendicular to a plane of a substrate of the sensor. The four proof masses are configured to move along two axes of motion that are both in-plane relative to the substrate. Coupling structures are provided for connecting the four proof masses. In particular, the coupling structures are positioned between adjacent edges of the proof masses to form connections to each of the four proof masses only through the adjacent edges. These centrally positioned coupling structures are configured to mechanically constrain or suppress in-phase motion, also referred to herein as common mode motion, for both in-plane directions of movement of the proof masses while maintaining symmetry and reducing the potential for accelerations inducing movement through the coupling structures. Accordingly, the centrally positioned coupling structures may enable improved accuracy and robustness in a four proof-mass architecture. The four proof-mass architecture with the centrally positioned coupling structures may be configured as a frequency modulated (FM) angular rate sensor or an amplitude modulated (AM) angular rate sensor.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:
1. An angular rate sensor comprising:
a substrate having a surface;
first, second, third, and fourth proof masses spaced apart from the surface of the substrate, each of the first, second, third, and fourth proof masses being configured to move along first and second transverse axes parallel to the surface;
a first coupling structure interposed between and interconnecting the first and second proof masses;

a second coupling structure interposed between and interconnecting the second and third proof masses;
a third coupling structure interposed between and interconnecting the third and fourth proof masses; and
a fourth coupling structure interposed between and interconnecting the fourth and first proof masses; and
wherein the first, second, third, and fourth coupling structures are configured to constrain an in-phase motion of adjacent ones of the first, second, third, and fourth proof masses along the first and second transverse axes;
wherein each of the first, second, third, and fourth coupling structures comprises a first coupling portion disposed between first and second compliant structures included in a second coupling portion;
wherein the first coupling portion is configured to constrain the in-phase motion of the adjacent ones of the first, second, third, and fourth proof masses along one of the first and second transverse axes;
wherein the second coupling portion configured to constrain the in-phase motion of the adjacent ones of the first, second, third, and fourth proof masses along the other of the first and second transverse axes;
wherein the first compliant structure is coupled to a first sidewall of one of the first, second, third, and fourth proof masses and is coupled to a second sidewall of another one of the first, second, third, and fourth proof masses, the first and second sidewalls being adjacent to one another and spaced apart from one another by a gap; and
wherein the second compliant structure is coupled to the first sidewall and is coupled to the second sidewall; and
wherein each of the first and second compliant structures comprises:
a first spring section having a first end coupled to the first sidewall, the first spring section being compliant in each of first and second directions parallel to the surface of the substrate;
a second spring section having a second end coupled to the second sidewall, the second spring section being compliant in each of the first and second directions; and
a lever element having a length aligned with the first and second sidewalls, the lever having a first lever end coupled to the first spring section and a second lever end coupled to the second spring section.

2. The angular rate sensor of claim 1, wherein the first coupling portion comprises:
a pivot structure coupled to a first sidewall of one of the first, second, third, and fourth proof masses and coupled to a second sidewall of another one of the first, second, third, and fourth proof masses, the first and second sidewalls being adjacent to one another and spaced apart from one another by a gap; and
an anchor on the surface of the substrate and located in the gap between the first and second sidewalls, the anchor being coupled to a mid-point of the pivot structure.

3. The angular rate sensor of claim 2 wherein the pivot structure comprises:
a first pivot bar having a first mid-point coupled to the anchor by a first spring, a first end coupled to the first sidewall via a second spring, and a second end coupled to the second sidewall via a third spring; and
a second pivot bar having a second mid-point coupled to the anchor by a fourth spring, a third end coupled to the first sidewall via a fifth spring, and a fourth end coupled to the second sidewall via a sixth spring.

4. The angular rate sensor of claim 2 wherein the pivot structure is configured to move flexibly about the anchor such that opposite ends of the pivot structure are configured to move in opposite directions to enable first and second sidewalls to move past one another in opposing directions.

5. The angular rate sensor of claim 1 wherein the first and second compliant structures are arranged in reflection symmetry relative to an axis of symmetry aligned with the first coupling portion.

6. The angular rate sensor of claim 1 wherein the lever element is configured to rotate such that first and second lever ends are configured to move in opposite directions and first and second spring sections are configured to flex to enable the first and second sidewalls to move in phase opposition relative to one another.

7. The angular rate sensor of claim 1 wherein the first, second, third, and fourth coupling structures constrain the in-phase motion of the adjacent ones of first, second, third, and fourth proof masses in the absence of additional in-phase motion constraining coupling structures outside a boundary of the first, second, third, and fourth proof masses.

8. The angular rate sensor of claim 1 wherein:
the angular rate sensor is sensitive to angular velocity about a third axis oriented perpendicular to the surface of the substrate;
the angular rate sensor further comprises actuators configured to enable drive motion of the first and third proof masses along both of the first and second transverse axes in a first orbital drive direction at a drive frequency and configured to enable drive motion of the second and fourth proof masses along both of the first and second transverse axes in a second orbital drive direction at the drive frequency, the second orbital drive direction being opposite from the first orbital drive direction; and
the drive frequency of the drive motion of the first, second, third, and fourth proof masses is configured to change in response to the angular velocity of the angular rate sensor about the third axis.

9. The angular rate sensor of claim 1 wherein:
the angular rate sensor is sensitive to angular velocity about a third axis oriented perpendicular to the surface of the substrate;
the angular rate sensor further comprises actuators configured to enable drive motion of the first and third proof masses in a first drive direction parallel to the first axis and configured to enable drive motion of the second and fourth proof masses parallel to the first axis and in a second drive direction that is opposite from the first drive direction;
the first and third proof masses are configured to move in a first sense direction parallel to the second axis in response to the angular velocity of the angular rate sensor about the third axis; and
the second and fourth proof masses are configured to move in a second sense direction parallel to the second axis that is opposite from the first sense direction in response to the angular velocity of the angular rate sensor about the third axis.

* * * * *